United States Patent [19]

Takada

[11] 4,387,911
[45] Jun. 14, 1983

[54] SEAT BELT SYSTEM USING LAP BELT HAVING ENERGY ABSORPTION CAPACITY

[76] Inventor: Juichiro Takada, 3-12-1, Shinmachi, Setagayaku, Tokyo-to, Japan

[21] Appl. No.: 115,783

[22] Filed: Jan. 28, 1980

[30] Foreign Application Priority Data

Mar. 8, 1979 [JP] Japan .................................. 54-27372

[51] Int. Cl.³ ............................................ B60R 21/10
[52] U.S. Cl. ..................................... 280/802; 280/804
[58] Field of Search ....................... 297/470, 471, 472; 139/383 R; 280/802, 803, 805, 751; 244/151 R

[56] References Cited

U.S. PATENT DOCUMENTS

| | | | |
|---|---|---|---|
| 3,550,957 | 12/1970 | Radke | 297/472 |
| 3,561,819 | 2/1971 | Renneker | 297/472 |
| 3,865,397 | 2/1974 | Pilhall et al. | 280/803 |
| 3,872,895 | 3/1975 | Takada | 139/383 R |
| 3,891,272 | 6/1975 | Takada | 280/805 X |
| 3,984,128 | 10/1976 | Oehm et al. | 280/751 |
| 4,027,906 | 6/1977 | Matsuoka et al. | 280/805 X |
| 4,124,224 | 11/1978 | Matsuoka | 280/802 X |
| 4,159,834 | 7/1979 | Miller | 280/802 |
| 4,191,400 | 3/1980 | Smith | 280/808 |

FOREIGN PATENT DOCUMENTS 2426203 12/1975 Fed. Rep. of Germany ...... 280/805

*Primary Examiner*—Robert R. Song
*Attorney, Agent, or Firm*—Brumbaugh, Graves, Donohue & Raymond

[57] ABSTRACT

The waist belt of a three-point vehicle passenger restraint belt system is contructed to absorb the kinetic energy of the occupant during the initial part of a collision by forced elongation and then to restrain the occupant's lower body for the remaining part of the collision.

6 Claims, 9 Drawing Figures

SEAT BELT SYSTEM USING LAP BELT HAVING ENERGY ABSORPTION CAPACITY

BACKGROUND OF THE INVENTION

This invention relates to an improvement in a three-point system seat belt for restraining a passenger seated on a car seat and more particularly contemplates ensuring mitigation of impact to the head and waist of the passenger and to protect him at the time of high speed collision of the car.

Various studies have previously been made in an attempt to minimize the impact energy in a seat belt and to protect a passenger, and various counter-measures have already been proposed such as those involving the construction of the belt webbing or the like. In these conventional systems, however, a greater emphasis has been placed on the shoulder belt rather than on the waist belt, partly for the purpose of coping with head-on collisions, or from the viewpoint of standards imposed on the seat belt. Hence, the energy absorption capacity of the shoulder belt has been of greater significance. In this regard, U.S. Pat. No. 3,891,272 discloses a three-point seat belt system wherein the shoulder belt is provided with overlapping sections joined together with stitching which is rupturable under progressively larger loads. The rupturing of the stitching causes the shoulder belt to extend and to absorb some of the impact energy.

As a result of analysis of actual high speed car accidents and data of collision experiments in order to trace and examine a transfer quantity to each of the head, chest, waist and femur, it has been found that though the energy absorption effect of the shoulder belt is good when the car speed is relatively low, stretch-out of the shoulder belt becomes greater as the car speed increases whereby an injury index of the upper half of the passenger's body, especially that of the head, becomes greater.

SUMMARY OF THE INVENTION

The inventor of the present invention has conducted extensive experiments using a dummy to solve these problems and has found from the behavior of the dummy that the absorption of the impact energy, and hence the lessening of injury to the passenger, is enhanced if the absorption mechanism functions differently during the early and late portions of the impact sequence. In other words, the inventor has repeated a number of experiments to examine various occurrences at the time of collision and has found that overall acceleration and deceleration acting on the passenger's head and chest can be reduced extremely effectively if forward inclination of the upper half of the passenger's body is retarded by causing him to move horizontally as he is in his driving or ordinary posture during the initial portion of the total energy absorption period by providing for substantial extension of the waist belt during such initial portion.

On the basis of the above-mentioned finding, the present invention provides a seat belt which exhibits excellent impact-mitigation function and high energy absorption capacity against the high speed collision of the car.

Although the essential features of the present invention will become apparent from the following detailed description, the gist of the present invention resides, briefly stated, in a construction wherein energy absorption means is provided to the waist belt portion of a three-point system seat belt so that the passenger's waist moves forwardly a substantial distance and energy is absorbed predominately by the waist belt during the initial part of the total period of kinetic energy absorption. In this manner, acceleration and peak load applied to the waist, chest and head of the seated passenger due to his forward inclination are reduced as compared to state-of-the-art systems.

DESCRIPTION OF THE PREFERRED EMBODIMENTS

Figure 1:
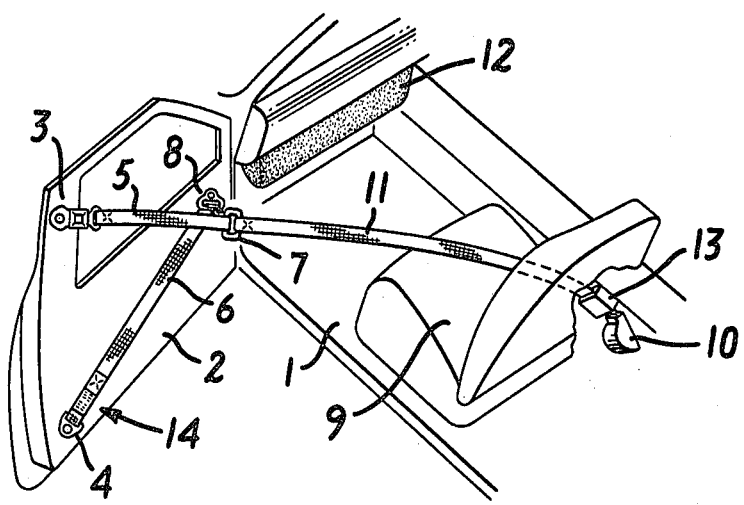
FIG. 1 is a perspective view of a seat belt system embodying the present invention.

FIG. 1 shows an example in which the energy absorption means according to the invention is used in a known passive three-point seat belt system. One end of the shoulder belt portion 5 of a continuous lap and shoulder belt is detachably fastened by an emergency escape buckle 3 to the upper rear corner of a door 2. The belt passes slidably through a coupling ring 7 and is folded back on one side of the ring, thus changing into a waist belt 6. The end of the resulting waist belt is anchored on an anchor 4 on the lower side of the door 2 via a guide ring 8 which is caused to reciprocate in accordance with opening and closing of the door by a suitable responsive drive mechanism (not shown). A retractile belt 11 having the ring 7 at one end leads from an emergency locking retractor 10 located inboard of the seat 9.

In the belt system having the above-described construction, an energy absorption means 14 constituting the feature of the present invention is provided at a position adjacent the anchor 4 at the lower rear portion of the door, and a belt clamp 13 is disposed adjacent the retractor 10 on the center part of the car 1 so as to prevent unwinding of the belt due to tightening of remaining turns of the belt 10 when a high force is applied to the belt.

Figure 2:
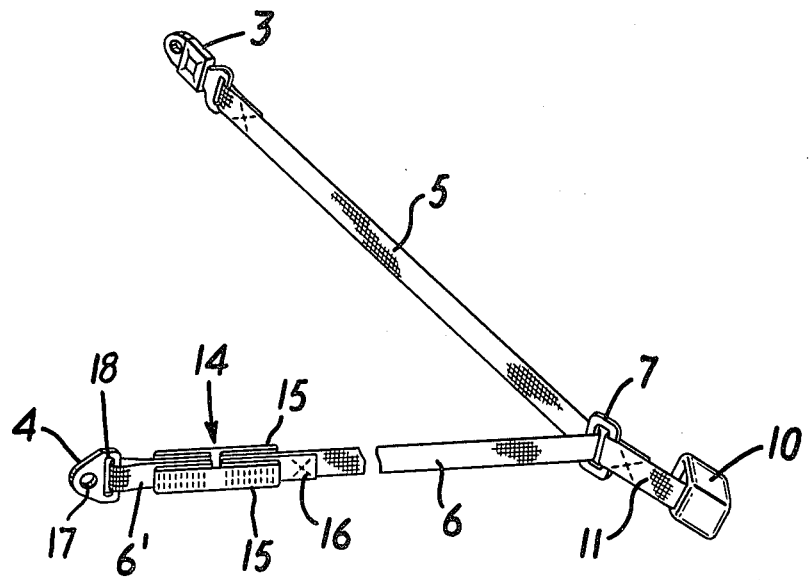
FIG. 2 is another perspective view of the belt system of FIG. 1.
Figure 3:
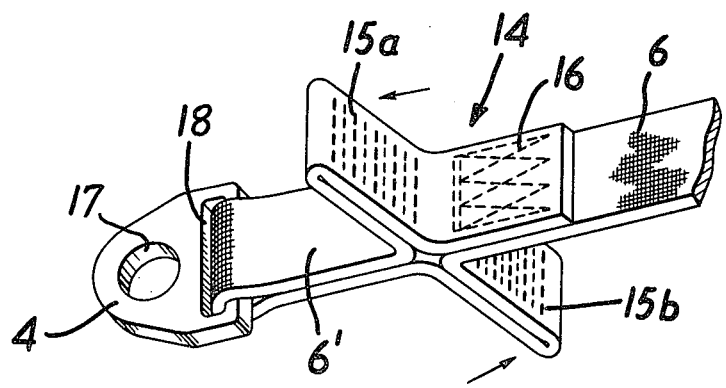
FIG. 3 is a perspective view of an energy absorption means of the present invention during energy absorption.

FIG. 2 is a partial diagrammatic view which illustrates more clearly the belt system shown in FIG. 1, and FIG. 3 shows one form of energy absorption system in detail. The energy absorption system in this embodiment is formed by passing the outboard end portion of the belt through the belt slot 18 of the anchor 4, then folding a length of the belt back on along the incoming section, sewing the folded-back part of the belt to form a double-belt portion 6', forming at least one fold in each belt segment of the double-belt portion to form U-shaped loops 15 and sewing the loops to form tear-out loop portions 15a and 15b. Each loop 15 should be sewed separately, and the incoming and outgoing segments and double-belt portion 6' should not be sewn together except at the end stitching 16. The sewing direction of the sewing yarns is preferably the same as the direction of the wefts (filling) of the waist belt 6.

Figure 4:
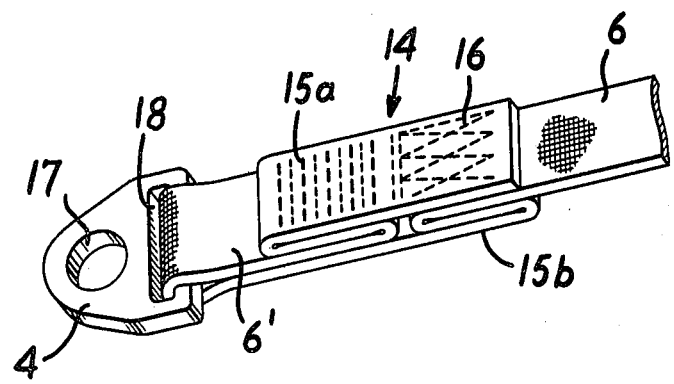
FIG. 4 is a perspective view of an energy absorption means of the present invention prior to energy absorption.
Figure 5:
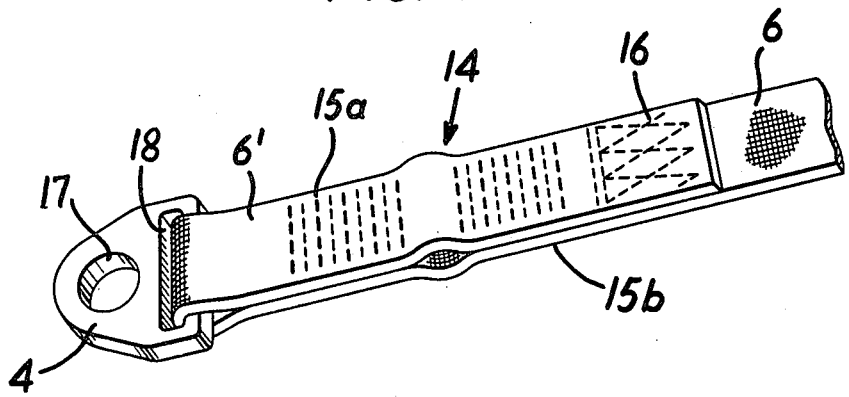
FIG. 5 is a perspective view of an energy absorption means after the energy absorption.

FIGS. 3 to 5 show diagrammatically the mode of operation of the energy absorption loop system. Normally the loop portions lie flat as shown in FIG. 4—they can be lightly tack-stitched to retain that configuration under normal use. When a predetermined load is applied to the lap belt due to collision of the car or the like, the sewed loop portions 15a and 15b first, upright with respect to the belt face, stand (by rupture of the tack-stitching) as shown in FIG. 3, and the sewing threads which hold the loops 15a and 15b then break either simultaneously on both loops 15a and 15b or sequentially on one loop and then the other, each loop failing stitch-row by stitch-row so that ultimately the loops open fully and increase the waist belt length while absorbing the impact energy as shown in FIG. 5. For this reason, the numbers of stitches and the rupture characteristics of the sewing threads must be selected in accordance with the energy absorption objectives of the particular system.

For example, both thick and thin threads may be sewed in transverse stitch rows of from about 3 cm. to 6 cm. in length and with a number of stitches in each row such that the row ruptures at loads in the range of about 400 kg. to 600 kg. More precisely, polyester threads of 250 D$\times$3/3, as the thick threads, and of 250 D$\times\frac{1}{3}$, as the thin threads, are sewn alternately in rows about 5 cm. long and parallel to each other so as to prolong the energy absorption time. Needless to say, this is just an example, and various modifications of sewing may naturally be made in accordance with the invention.

Figure 7:
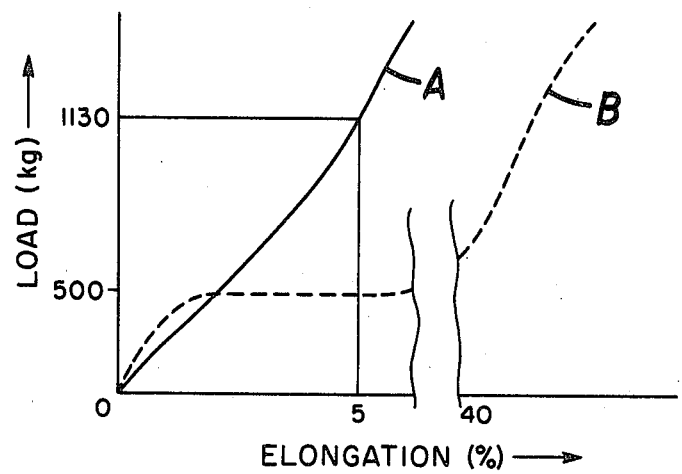
FIG. 7 is a chart showing the load-elongation curves of the waist belt and the shoulder belt.

The webbing used for shoulder and waist continuous belts is generally of a non-energy absorbing type which exhibits elongations of only up to 5% at a load of 1130 kg. as indicated by the deformation curve A of FIG. 7. The above-mentioned sewed loops 15a and 15b are formed in the belt such that the waist belt elongates substantially (e.g., about 40%) at a load of about 500 kg., as indicated by the dotted line B in FIG. 7.

Figure 6:
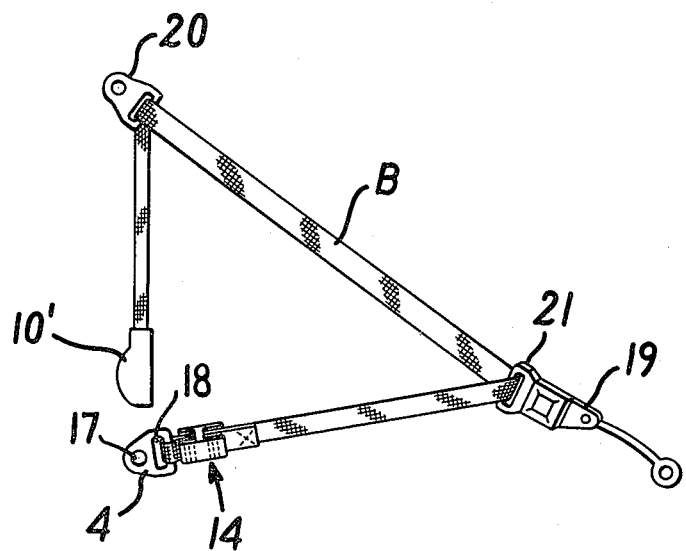
FIG. 6 is a perspective view showing another embodiment of the belt system.

FIG. 6 shows another example of a belt system having an energy absorption system according to the present invention. In this system, the retractor 10 on the inboard side of the seat of FIGS. 1 and 2 is replaced by a buckle 19, and a retractor 10' is installed in the rear part of the door. The belt B leads from the retractor 10' through an anchor 20 at the upper rear corner of the door, inwardly and downwardly across the seat to and through the ring part 21 of a buckle 19 and outwardly across the seat to an anchor 4 affixed near the lower rear corner of the door. The energy absorption system 14 is provided adjacent the anchor 4 in the waist part of the belt in the same way as in the embodiment of FIGS. 1 and 2.

The belt systems shown in FIGS. 1, 2 and 6, to which the present invention is adaptable, are passive systems, but the present invention is by no means specifically limited to those particular passive belt systems but can also adapt to other three-point systems, both passive and non-passive.

It is also preferable in systems embodying the present invention to have a knee pad 12 below the instrument panel in front of the seat 9, as shown in FIG. 1 in order to protect the knee portion of the passenger. In this case, since the waist belt 6 has an energy absorption function, the energy absorption capacity of the knee pad may be within the range of 300–500 kg., unlike the knee pads in the conventional passive belt which have energy-absorption capacities as high as 800 kg.

Though the foregoing explanation deals with an energy-absorption system based on tear-away sewed loops in the waist belt, the energy-absorption system may also employ extensible webbings for the waist belt such as those disclosed in U.S. Pat. No. 3,872,895. The waist belt portion of such a system includes warp threads which break at a load of about 400 to 600 kg. and may be combined with a shoulder belt of an energy non-absorbing type, thereby forming a continuous belt having an energy-absorbing extensible waist belt portion and a non-extensible shoulder belt portion.

With the above in mind, the following explanation covers the action of the seat belt system of the present invention on the basis of observations of various conditions at the time of impact in tests using a dummy.

Figure 9:
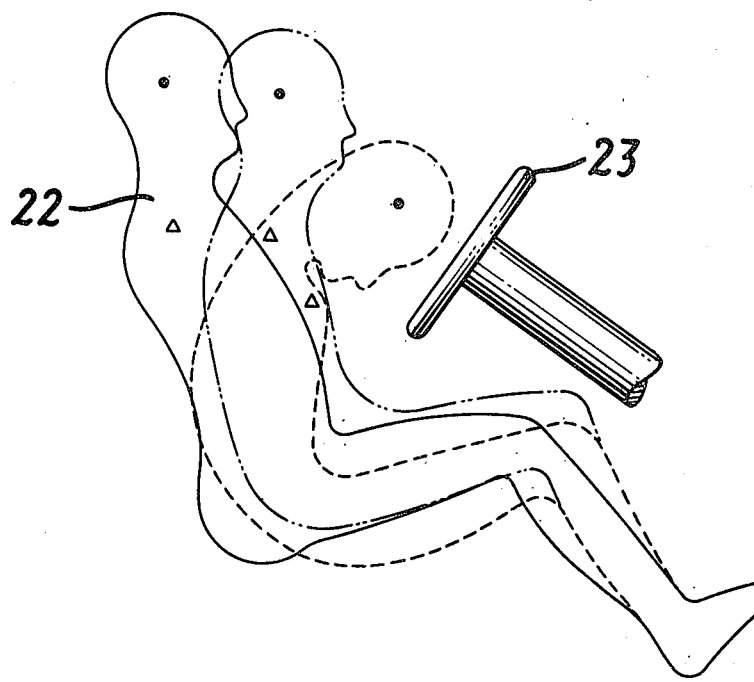
FIG. 9 is a schematic view showing the state of movement at the time of high speed collision of the car by means of a dummy.

FIG. 9 illustrates the modes of impact to the dummy 22. The normal posture of the dummy in the seat is indicated by the solid line. The double-dot dash line represents the posture of the dummy after about the first half of the energy-absorption period during which the dummy has completed horizontal movement in more or less the same posture as his normal seated posture after the extension of the length of the waist belt due to a load of 400 to 600 kg. The dashed line represents the forwardly inclined posture of the dummy at the peak of energy-absorption.

Figure 8:
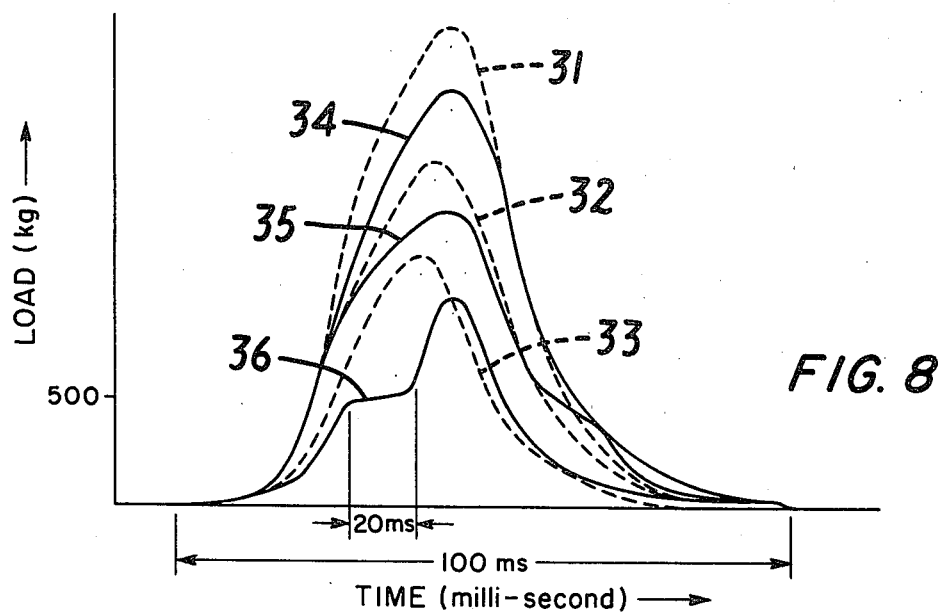
FIG. 8 is a chart showing the relation between the load and time for each of the waist belt, the shoulder belt and the retractile belt.

As can be seen clearly from the drawing, the dummy experiences movement of the head and chest during the impact without experiencing secondary collision with the steering wheel 23 or any part of the front of the passenger compartment. The reason for this is the relation that exists between the instantaneous loads on the restraint belt and the time during impact, which relation is shown in FIG. 8. The dotted lines represent the energy absorption curves of the loads on a conventional three-point system having no energy-absorbing portion—the dotted lines 31, 32 and 33 represent the load curves of the retractile belt 11, the shoulder belt 5 and the waist belt 6, respectively (see FIGS. 1 and 2) of the conventional system. On the other hand, the load curve of each belt portion of the belt system having the sewed loops 15a and 15b for energy absorption, according to the present invention, in the waist belt 6 are shown in solid lines 34, 35, 36, which represent the magnitude of the load on the retractile belt 11, the shoulder belt 5 and the waist belt 6, respectively. It can be seen that though the load time is only slightly longer, the load peak is substantially lower in the belt systems of the present invention than in the conventional belt systems. Looking specifically at the line 36 (the waist belt load curve) the rise of the load is retarded by a period in which the sewed portions 15a and 15b of the waist belt 6 tear apart. During a period of about 20 ms during which the rows of stitches break sequentially at a load of about 400 to 600 kg., the load does not increase and the dummy moves horizontally forward and slightly up generally in normal sitting posture from the position and posture indicated by the solid line to the position and posture indicated by the double-dot dash line in FIG. 9—where the waist belt is fully extended and the dummy has moved forward slightly upward, but its upper portion has not been thrown forward far enough to hit the steering wheel or windshield because some of the kinetic energy has been absorbed by controlled forward movement of the waist portion. Friction between the belt and the coupling ring 7 (FIG. 1) or the buckle ring 21 (FIG. 6) generated by the large forces of the restraint belt keeps the restraint belt from pulling through the ring, so no locking device is required to prevent pull-through. Because the energy-absorption time is small (about 100 ms), the amounts of extension of the waist and shoulder belt portions due to plastic elongation are about 50 mm. and 100 mm., respectively.

When the belt system is of a type other than the passive belt, a slide-preventing device can be used at the juncture of the waist and shoulder belts or they may be sewed fast to a coupling or buckle ring. Thus when the waist belt 6, which substantially increases in length as shown in FIG. 5, absorbs the energy, the shoulder belt 5 also is affected by the energy absorption so that the load peak of the retractile belt 11 becomes lower than that of the conventional belt, thereby decreasing the incidence of injury 7 of the passenger.

As described in the foregoing paragraph, as a result of analysis of the behavior of the seated passenger at the time of high speed collision of the car, the seat belt in accordance with the present invention makes it possible to minimize not only the external injury to the upper half of the passenger's body but also the impact load during the later stages of the rise in the load by means of the substantial extension of the waist belt by rupture of tear-away loops or of special breakable warp threads in a highly extensible webbing. Accordingly, it is possible in accordance with the present invention to markedly reduce the load peak while only slightly increasing the load time and, thus, to greatly mitigate possible injury to the head and the chest of the vehicle occupant. Hence, the present invention provides extremely remarkable benefits to the safety of the occupant.

I claim:

1. In a three-point passenger restraint belt system supported by anchor means at upper and lower locations outboard of a vehicle seat and a location inboard of the seat, said system comprising a continuous belt passed through a coupling ring at an intermediate portion of said belt, one side of said coupling ring being slidable on the continuous belt and defining the juncture of a waist belt portion and a shoulder belt portion, the other side of said coupling ring being attached to a retractile belt wound on an emergency locking retractor attached to said inboard anchor means, the improvement wherein the waist belt includes means for absorbing the kinetic energy of the occupant during an initial part of the time of a vehicle collision for initially restraining the waist of the passenger until a predetermined load is exerted on the waist belt, for thereupon permitting the waist portion of the passenger to move forwardly in the vehicle a predetermined distance, and for thence again restraining the waist of the passenger, said energy absorption means comprising a portion of the waist belt that passes through the lower outboard anchor means and is superposed upon and attached to an incoming portion to form a double-belt portion, a portion of each belt length of said double-belt portion being unattached to the other such portion, and each of the unattached belt portions of the double-belt portion being folded into a U-shaped loop and stitched by rows of stitching which break at said predetermined waist belt load and thereby permit each said loop to unfold and extend the length of the waist belt.

2. The improvement according to claim 1 wherein the rows of stitching joining the loops extend weft-wise of the belt.

3. The improvement according to claim 1 wherein said energy absorption means of the waist belt includes warp elements woven into the belt which have substantial plasticity and are capable of absorbing energy over the entire waist belt portion and said waist belt is joined to a shoulder belt of a non-energy absorbing webbing.

4. The improvement according to claim 1 or claim 2 wherein said loops are capable of sustaining a kinetic load at the time of vehicle collision in the range of about 400 kg. to 600 kg. before said stitching breaks.

5. The improvement according to claims 1 or 9 and further comprising an energy-absorbing knee pad in front of the vehicle seat for protecting the knees of the passenger.

6. In a three-point passenger restraint belt system supported by anchor means at upper and lower locations outboard of a vehicle seat and a location inboard of the seat, said system comprising a continuous belt passed through a coupling means at an intermediate portion of said belt and defining the juncture of a waist belt portion and a shoulder belt portion, said coupling means including a buckle ring through which the intermediate portion of the continuous belt is slidable and a buckle attached to said inboard anchor means, the improvement wherein the waist belt includes means for absorbing the kinetic energy of the occupant during an initial part of the time of a vehicle collision for initially restraining the waist of the passenger until a predetermined load is exerted on the waist belt, for thereupon permitting the waist portion of the passenger to move forwardly in the vehicle a predetermined distance, and for thence again restraining the waist of the passenger, said energy absorption means comprising a portion of the waist belt that passes through the lower outboard anchor means and is superposed upon and attached to an incoming portion to form a double-belt portion, a portion of each belt length of said double-belt portion being unattached to the other such portion, and each of the unattached belt portions of the double-belt portion being folded into a U-shaped loop and stitched by rows of stitching which break at said predetermined waist belt load and thereby permit each said loop to unfold and extend the length of the waist belt.

* * * * *